(12) United States Patent
Tian

(10) Patent No.: US 12,261,472 B2
(45) Date of Patent: Mar. 25, 2025

(54) RECHARGEABLE DEVICE AND CHARGING METHOD

(71) Applicant: GUANGDONG OPPO MOBILE TELECOMMUNICATIONS CORP., LTD., Guangdong (CN)

(72) Inventor: Chen Tian, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 757 days.

(21) Appl. No.: 17/565,381

(22) Filed: Dec. 29, 2021

(65) Prior Publication Data

US 2022/0123575 A1 Apr. 21, 2022

Related U.S. Application Data

(63) Continuation of application No. PCT/CN2019/103325, filed on Aug. 29, 2019.

(51) Int. Cl.
*H02J 7/00* (2006.01)
(52) U.S. Cl.
CPC ........ *H02J 7/00712* (2020.01); *H02J 7/0047* (2013.01)
(58) Field of Classification Search
CPC ............................ H02J 7/00712; H02J 7/0047
See application file for complete search history.

(56) References Cited

U.S. PATENT DOCUMENTS

| 8,890,488 B2 * | 11/2014 | Fukui | B60L 3/0046 320/163 |
| 10,514,426 B2 * | 12/2019 | Liao | G01R 31/388 |
| 2014/0062387 A1 * | 3/2014 | Kim | H02J 7/0036 320/137 |

(Continued)

FOREIGN PATENT DOCUMENTS

| CN | 105207289 A | 12/2015 |
| CN | 205811601 U | 12/2016 |
| CN | 106684996 A | 5/2017 |

(Continued)

OTHER PUBLICATIONS

Extended European Search Report for EP Application 19943185.9 mailed Jun. 29, 2022. (5 pages).

(Continued)

*Primary Examiner* — Richard V Muralidar
(74) *Attorney, Agent, or Firm* — Young Basile Hanlon & MacFarlane, P.C.

(57) ABSTRACT

A rechargeable device and a charging method are disclosed. The rechargeable device includes a charging interface, a battery unit, a first switch unit and a second switch unit, a first control unit coupled to the first switch unit, and a second control unit coupled to the second switch unit. The first control unit is configured to control the first switch unit to be turned on in response to the charging path being needed to be on, and to control both the first switch unit and the second switch unit to be turned off in response to the charging path being needed to be off. The second control unit is configured to control the second switch unit to be turned on or off in response to the first control unit controlling the first switch unit to be turned on.

20 Claims, 5 Drawing Sheets

(56) References Cited

U.S. PATENT DOCUMENTS

2017/0256969 A1  9/2017  Du
2017/0346140 A1* 11/2017  Koebler .............. H01M 4/5825

FOREIGN PATENT DOCUMENTS

CN      207398851 U    5/2018
JP      2001268816 A   9/2001

OTHER PUBLICATIONS

Chinese First Office Action with English Translation for CN Application 201980097234.3 mailed Nov. 2, 2023. (11 pages).
International Search Report with English Translation for PCT Application PCT/CN2019/103325 mailed May 28, 2020. (11 pages).

* cited by examiner

RECHARGEABLE DEVICE AND CHARGING METHOD

CROSS-REFERENCE TO RELATED APPLICATION(S)

The present disclosure is a continuation-application of International (PCT) Patent Application No. PCT/CN2019/103325 filed on Aug. 29, 2019, the content of which is herein incorporated by reference in its entirety.

TECHNICAL FIELD

The present disclosure generally relates to the technical field of charging, and in particular to a rechargeable device and a charging method.

BACKGROUND

Rechargeable devices have got more and more consumers' favor, but have great power consumption and need to be charged frequently. It usually takes hours for these devices using a normal charging scheme with low power. To meet this challenge, a fast charging scheme, which increases the charging power of these devices, has been proposed in this industry.

In order to increase the charging power of these devices and thus achieve fast charging, one option is to use high current to charge these devices. The higher the charging current is, and the faster the charging speed of these devices will be. In a fast charging scheme, a MOSFET (Metal Oxide Semiconductor Field Effect Transistor, abbreviated as MOS transistor) is usually electrically coupled to batteries in these devices, and a control module such as an MCU (Microcontroller Unit) is used to control a driving circuit electrically coupled to the MOS transistor to turn on and off the MOS transistor. Thus, the fast charging is realized to be turn on and off.

In this connection, according to the characteristics of the MOS transistor, when the voltage between the gate and the source is located in a certain range, the smaller the on-state impedance (i.e. RDSon) between the gate and the source becomes. Thus, the on-state impedance of the MOS transistor can be reduced by increasing the voltage between the gate and the source. Therefore, when the high current is used for charging, generally speaking, another MOS transistor with a smaller on-state impedance is used or the voltage between the gate and the source of the MOS transistor is increased to reduce the heat of the MOS transistor. However, there usually requires high design requirements for the path impedance in this approach, such as high design requirements for the line width and line diameter, making the design more difficult.

The above information disclosed in the described background technology is intended only to enhance the understanding of the background of this disclosure, and therefore it may include information that does not constitute prior art known to those ordinary skill in the art.

SUMMARY

In the view of the above, a rechargeable device and a charging method are provided.

Other features and advantages of the present disclosure will become apparent through the following detailed description, or will be learned in part through the practice of the present disclosure.

According to one aspect of the present disclosure, a rechargeable device is provided. The rechargeable device includes: a charging interface; a battery unit; a first switch unit and a second switch unit coupled in parallel, coupled between the charging interface and the battery unit, a charging path defined between the battery unit and the charging interface being on and the battery unit being charged by a voltage and a current input by the charging interface, in response to the first switch unit and/or the second switch unit being turned on; a first control unit coupled to the first switch unit, configured to control the first switch unit to be turned on in response to the charging path being needed to be on, and to control both the first switch unit and the second switch unit to be turned off in response to the charging path being needed to be off; and a second control unit coupled to the second switch unit, configured to control the second switch unit to be turned on or off in response to the first control unit controlling the first switch unit to be turned on.

According to another aspect of the present disclosure, another rechargeable device is provided. The rechargeable device includes: a charging interface; a battery unit; at least two charging paths defined between the battery unit and the charging interface, comprising a first charging path and a second charging path, the first charging path having a first switch unit thereon and the second charging path having a second switch unit thereon; a driving circuit coupled to the first switch unit and the second switch unit; a first control unit coupled to the driving circuit, configured to send a first control signal via the driving circuit to the first switch unit and the second switch unit, the first control signal indicating that the first switch unit is be turned on in response to the first charging path being needed to be on, and that both the first switch unit and the second switch unit is be turned off in response to the second charging path being needed to be off; and a second control unit coupled to the driving circuit, configured to send a second control signal via the driving circuit to the second switch unit, the second control signal indicating that the second switch unit is turned on or off in response to the first switch unit being turned on.

According to yet another aspect of the present disclosure, a charging method is provided in a rechargeable device described in above aspect. The charging method includes sending a first control signal via the drive circuit to the first switch unit and the second switch unit, the first control signal indicating that the first switch unit is be turned on in response to the first charging path being needed to be on, and that both the first switch unit and the second switch unit is be turned off in response to the second charging path being needed to be off; wherein the second control unit sends a second control signal via the driving circuit to the second switch unit, the second control signal indicating that the second switch unit is turned on or off in response to the first switch unit being turned on.

It should be understood that the above general description and the following detailed description is exemplary only and do not limit the present disclosure.

BRIEF DESCRIPTION OF DRAWINGS

The foregoing and other objects, features and advantages of the present disclosure will become more apparent by a detailed description of exemplary embodiments thereof with reference to the accompanying drawings.

DETAILED DESCRIPTION

Figure 1:
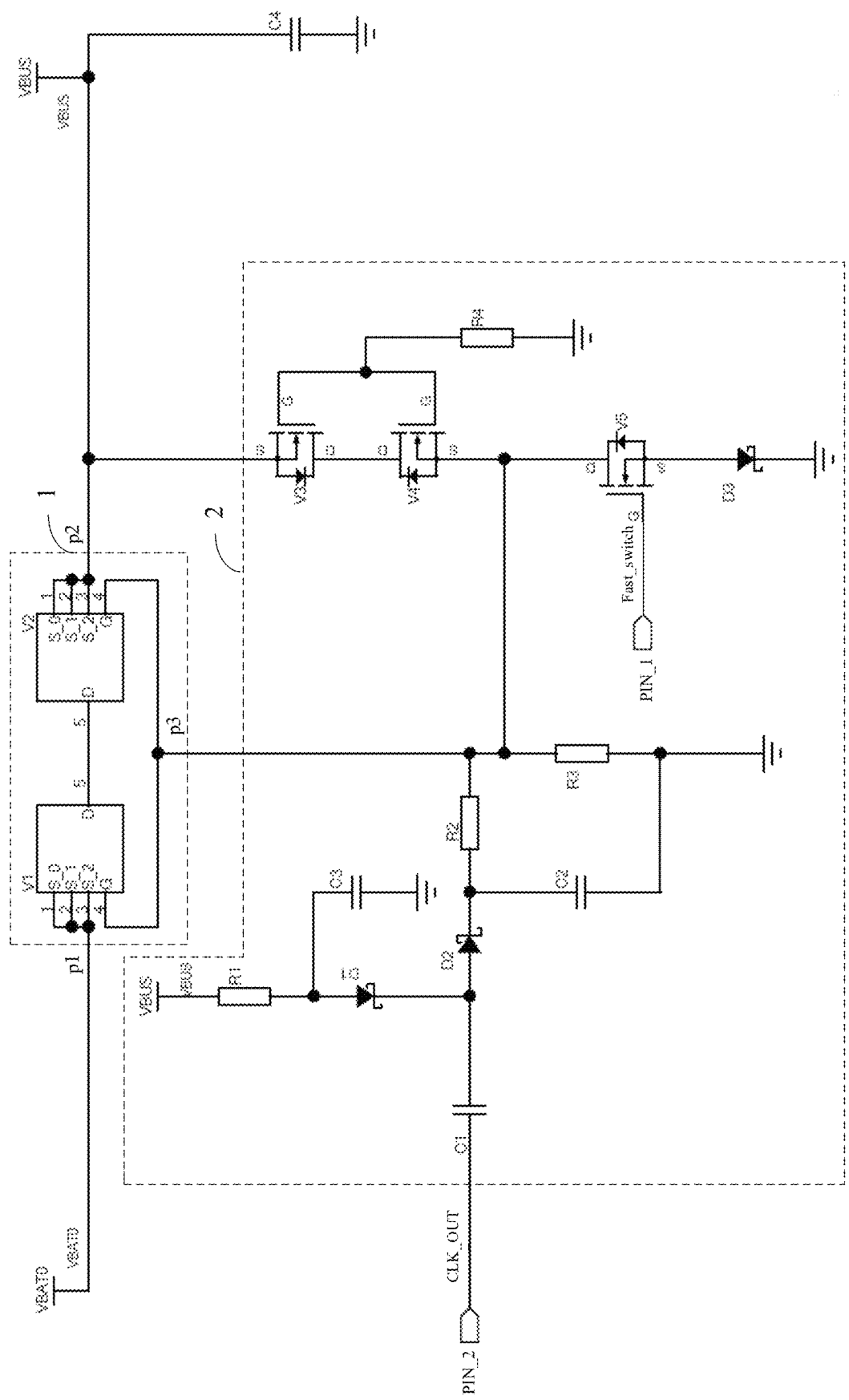
FIG. 1 is a circuitry of a switch unit and a driving circuit of a rechargeable device according to some examples.

Example embodiments will now be described more fully with reference to the accompanying drawings. However, the example embodiments can be implemented in a variety of forms and should not be construed as being limited to the examples set forth herein. Rather, these embodiments are provided to make the present disclosure more comprehensive and complete and to communicate the ideas of the example embodiments to those skilled in the art in a comprehensive manner. The accompanying drawings are only schematic illustrations of the present disclosure and are not necessarily drawn to scale. Identical appended markings in the drawing indicate identical or similar parts, and thus repetitive descriptions of them will be omitted.

In addition, the features, structures, or characteristics described may be combined in any suitable manner in one or more embodiments. In the following description, many specific details are provided so as to give a full understanding of the embodiments of the present disclosure. However, those skilled in the art will realize that it is possible to practice the technical embodiments of the present disclosure without omitting one or more of the particular details described, or with employing other methods, components, devices, steps, etc. In other cases, the well-known structure, method, apparatus, implementation, or operation is not shown or described in detail to avoid obscuring aspects of the present disclosure.

In this disclosure, unless otherwise expressly specified and limited, the terms "connected", "coupled", and the like are to be understood in a broad sense, e.g., being electrically connected or be communicated with each other, be directly connected or indirectly connected through an intermediate medium. For those of ordinary skill in the art, the specific meaning of the above terms in the present disclosure can be understood on a case-by-case basis.

In addition, in the description of the present disclosure, "plurality" means at least two, e.g., two, three, etc., unless otherwise expressly and specifically limited. "and/or", describing the association of related objects, indicates that three relationships may exist, such as A and/or B, which may indicate the presence of A alone, B alone, and both A and B. The symbol "/" generally indicates an "or" relationship between the associated objects that are located before and after. The terms "first" and "second" are used for descriptive purposes only and are not to be understood as indicating or implying relative importance or implicitly specifying the number of technical features indicated. Thus, features qualified with "first" and "second" may explicitly or implicitly include one or more features.

Before introducing the implementation of the present disclosure, the "normal charging mode" and "fast charging mode" in a charging system are described. In the normal charging mode, the adapter charges the battery in the rechargeable device by outputting a current with a relatively small value (which is usually less than 2.5 A) or in a relatively small power (which is usually less than 15 W). In the normal charging mode, it usually takes several hours to fully charge a battery with a large capacity (such as a battery with a capacity of 3000 mAh). In the fast charging mode, the adapter charges the battery in the rechargeable device by outputting a current with a relatively high current (which is usually greater than 2.5 A, such as 4.5 A, 5 A or even higher) or in a relatively high power (which is usually greater than or equal to 15 W). Compared with one in the normal charging mode, the adapter in fast charging mode has a faster charging speed and a significantly-reduced charging time required to fully charge a battery with the same capacity.

In the charging process, a power supply device (such as a power adapter, a mobile Power Bank) is generally coupled to the rechargeable device through a cable, and the power supplied by the power supply device is transmitted to the rechargeable device through the cable to charge the rechargeable device.

As described above, in a fast charging scheme in which a high current is used for charging, a MOS transistor is usually electrically coupled to a battery in a rechargeable device, and a control module is used to control a driving circuit electrically coupled to the MOS transistor to turn on and off the MOS transistor. Thus, the fast charging is realized to be turned on and off.

FIG. 1 is a circuitry of a switch unit and a driving circuit of a rechargeable device according to some examples. As shown in FIG. 1, the switch unit 1 may include, for example, a first MOS transistor V1 and a second MOS transistor V2. First poles (e.g., sources S_0 to S_2) of the first MOS transistor V1 is coupled to a battery unit via the first terminal p1, first poles (e.g., source S_0 to S_2) of the second MOS transistor V2 is coupled to a charging interface via a second terminal p2, a second pole (e.g., drain D) of the first MOS transistor V1 is coupled to a second pole (e.g., drain D) of the second MOS transistor V2, and a third pole (e.g., gate G) of the first MOS transistor V1 is coupled to a third pole (e.g., gate G) of the second MOS transistor V2. That is, the first MOS transistor V1 is coupled in reverse series with the second MOS transistor V2.

During the fast charging process (e.g. a fast charging adapter is coupled, which is capable of outputting a relatively high current (which is usually greater than 2.5 A, e.g. 4.5 A, 5 A or even higher) or a relatively high power output (which is usually greater than or equal to 15 W)), a first drive signal Fast_switch can be provided to the driving circuit 2 via a pin PIN_1 as shown in the figure, and the first drive signal Fast_switch is set to be low level. A MOS transistor V5 in the driving circuit 2 is cut off since the first drive signal Fast_switch is set to be low level, and a voltage VBUS provided by the power supply device is loaded between a diode D1 and a diode D2 via the diode D1. In addition, the second drive signal CLK_OUT, which is a square wave signal provided to the driving circuit 2 via a pin PIN_2, is also loaded between the diode D1 and the diode D2. In order to reduce the consumption of a capacitor C2 and reduce the power consumption of the overall charging circuit, a resistance value of a resistor R3 is usually large (e.g. above 100K ohms), and a current flowing through resistors R1, R2 and R3 is small. Thus, a voltage drop caused across these resistors is also small. Therefore, a level between the diode D1 and the diode D2 is [(VBUS−Vd)+Vclk], where Vd indicates a voltage drop across the diode D1 or D2, and Vclk indicates a voltage of the square wave signal CLK_OUT. Then, after rectification of the diode D2, a level between the diode D2 and a resistor R2 becomes [(VBUS−2Vd)+Vclk]. Then, passing through the resistor R2, a gate voltage of the first MOS transistor V1 and the second MOS transistor V2 is (Vclk−2Vd). A voltage between the gate and the source added to the first MOS transistor V1 is [(VBUS−VBAT0)+(Vclk−2Vd)]. Thus, the first MOS transistor V1 and the second MOS transistor V2 are enabled to be turned on, and then the fast charging is realized for the rechargeable device.

In order to reduce temperature of components in this path, the high current can be shunted by increasing a fast charging path. For example, the fast charging path is divided into two paths, each of which is designed according to the total current divided by two. However, if these two fast charging paths are controlled by one control signal, all the current will flow to the other path when one of the paths does not operates properly (e.g., due to device soldering or improper connection), and then the other path will heat up severely, or even dangerously due to overheating.

The application processor (AP) of the rechargeable device has the possibility to die, the safety of fast charging is reduced, and a separate MCU (Microcontroller Unit) is usually used to control the fast charging.

And if the MCU adopts two independent control signals to control the above two fast charging paths, independent control of multiple paths cannot be realized because the input/output interfaces (I/O interfaces) resources of MCU are generally not enough.

In view of this, a rechargeable device is provided in the present disclosure, which can independently control for multiple fast charging paths using independent control signals.

According to one aspect of the present disclosure, a rechargeable device is provided. The rechargeable device includes: a charging interface; a battery unit; a first switch unit and a second switch unit coupled in parallel, coupled between the charging interface and the battery unit, a charging path defined between the battery unit and the charging interface being on and the battery unit being charged by a voltage and a current input by the charging interface, in response to at least one of the first switch unit and the second switch unit being turned on; a first control unit coupled to the first switch unit, configured to control the first switch unit to be turned on in response to the charging path being needed to be on, and to control both the first switch unit and the second switch unit to be turned off in response to the charging path being needed to be off; and a second control unit coupled to the second switch unit, configured to control the second switch unit to be turned on or off in response to the first control unit controlling the first switch unit to be turned on.

In some embodiments, rechargeable device further includes a driving circuit, including: a first drive MOS transistor, coupled to the first switch unit and the first control unit, respectively; and a second drive MOS transistor, coupled to the second switch unit, the first control unit, and the second control unit, respectively; wherein the first drive MOS transistor is controlled to drive the first switch unit to be turned off and the second drive MOS transistor is controlled to drive the second switch unit to be turned off, in response to a first control signal sent from the first control unit being set to be a first level; and wherein the first drive MOS transistor is controlled to drive the first switch unit to be turned on, and the second drive MOS transistor is controlled by a second control signal sent from the second control unit and to drive the second switch unit to be turned on or off, in response to the first control signal being set to be a second level lower than the first level.

In some embodiments, the first drive MOS transistor is further coupled to the second drive MOS transistor via a first diode; and the second drive MOS transistor is coupled to the second control unit via a first resistor.

In some embodiments, the first control unit is an MCU.

In some embodiments, the second control unit is an application processor.

In some embodiments, the first control unit further provides a clock square wave signal.

In some embodiments, the first switch unit includes a first MOS transistor and a second MOS transistor, wherein a first terminal of the first MOS transistor is coupled to the battery unit, a first terminal of the second MOS transistor is coupled to the charging interface, a second terminal of the first MOS transistor is coupled to a second terminal of the second MOS transistor, and a control terminal of the first MOS transistor is coupled to a control terminal of the second MOS transistor; the first MOS transistor and the second MOS transistor are drove to be turned off such that the first switch unit is turned off, in response to the first control signal being set to be the first level; the first MOS transistor and the second MOS transistor are drove to be turned on such that the first switch unit is turned off, in response to the first control signal being set to be the second level.

In some embodiments, both the first terminal of the first MOS transistor and the first terminal of the second MOS transistor are sources, and both the second terminal of the first MOS transistor and the second terminal of the second MOS transistor are drains; or both the first terminal of the first MOS transistor and the first terminal of the second MOS transistor are drains, and both the second terminal of the first MOS transistor and the second terminal of the second MOS transistor are sources.

In some embodiments, the second switch unit includes a third MOS transistor and a fourth MOS transistor, wherein a first terminal of the third MOS transistor is coupled to the battery unit, a first terminal of the fourth MOS transistor is coupled to the charging interface, a second terminal of the third MOS transistor is coupled to a second terminal of the fourth MOS transistor, and a control terminal of the third MOS transistor is coupled to a control terminal of the fourth MOS transistor; the third MOS transistor and the fourth MOS transistor are drove to be turned off such that the second switch unit is turned off, in response to the first control signal via the first diode being set to be the first level; the third MOS transistor and the fourth MOS transistor are drove to be turned off such that the second switch unit is turned off, in response to the first control signal via the first diode being set to be the second level and the second control signal being set to be a third level; the third MOS transistor and the fourth MOS transistor are drove to be turned on such that the second switch unit is turned on, in response to the first control signal via the first diode being set to be the second level and the second control signal being set to be a fourth level lower than the third level.

In some embodiments, both the first terminal of the third MOS transistor and the first terminal of the fourth MOS transistor are sources, and both the second terminal of the third MOS transistor and the second terminal of the fourth MOS transistor are drains; or both the first terminal of the third MOS transistor and the first terminal of the fourth MOS transistor are drains, and both the second terminal of the third MOS transistor and the second terminal of the fourth MOS transistor are sources.

In some embodiments, the first terminal of the first drive MOS transistor and the first terminal of the second drive MOS transistor are coupled to the charging interface to receive a voltage provided by the power supply device; both the second terminal of the first drive MOS transistor and the second terminal of the second drive MOS transistor are grounded.

In some embodiments, both the first drive MOS transistor and the second drive MOS transistor are NMOS transistors, wherein both the first terminal of the first drive MOS transistor and the first terminal of the second drive MOS transistor are drains of the NMOS transistors, and both the second terminal of the first drive MOS transistor and the second terminal of the second drive MOS transistor are sources of the NMOS transistors.

In some embodiments, the rechargeable device further includes a third switch unit, coupled between the charging interface and the battery unit; wherein the driving circuit is further configured to drive the third switch unit to be turned on and off and further includes a third drive MOS transistor, the third drive MOS transistor being coupled to the third switch unit, the first control unit, and the second control unit; the third drive MOS transistor is controlled to drive the third switch unit to be turned off, in response to the first control signal sent from the first control unit being set to be the first level; the third drive MOS transistor is controlled by a third control signal sent from the second control unit to drive the third switch unit to be turned on or off, in response to the first control signal sent from the first control unit being set to be the second level.

In some embodiments, the first drive MOS transistor is further coupled to the third drive MOS transistor via a second diode; and the third drive MOS transistor is coupled to the second control unit via a second resistor.

According to another aspect of the present disclosure, another rechargeable device is provided. The rechargeable device includes: a charging interface; a battery unit; at least two charging paths defined between the battery unit and the charging interface, including a first charging path and a second charging path, the first charging path having a first switch unit thereon and the second charging path having a second switch unit thereon; a driving circuit coupled to the first switch unit and the second switch unit; a first control unit coupled to the driving circuit, configured to send a first control signal via the driving circuit to the first switch unit and the second switch unit, the first control signal indicating that the first switch unit is be turned on in response to the first charging path being needed to be on, and that both the first switch unit and the second switch unit is be turned off in response to the second charging path being needed to be off; and a second control unit coupled to the driving circuit, configured to send a second control signal via the driving circuit to the second switch unit, the second control signal indicating that the second switch unit is turned on or off in response to the first switch unit being turned on.

In some embodiments, the first control signal with a first level indicates that both the first switch unit and the second switch unit is be turned off in response to the second charging path being needed to be off, and the first control signal with a second level indicates that the first switch unit is be turned on in response to the first charging path being needed to be on, the second level being lower than the first level.

In some embodiments, the second control signal with a third level indicates that the second switch unit is turned off, the second control signal with a fourth level indicates that the second switch unit is turned on, the third level being lower than the fourth level.

In some embodiments, the driving circuit includes at least two drive MOS transistors; and the at least two drive MOS transistors includes: a first drive MOS transistor, coupled to the first switch unit and the first control unit, respectively; and a second drive MOS transistor, coupled to the second switch unit, the first control unit, the second control unit via a first resistor, and the first drive MOS transistor via a first diode, respectively; wherein the first drive MOS transistor is controlled to drive the first switch unit to be turned off and the second drive MOS transistor is controlled to drive the second switch unit to be turned off, in response to the first control signal being set to be the first level; and wherein the first drive MOS transistor is controlled to drive the first switch unit to be turned on, and the second drive MOS transistor is controlled by the second control signal to drive the second switch unit to be turned on or off, in response to the first control signal being set to be the second level.

In some embodiments, the first switch unit includes a first MOS transistor and a second MOS transistor, wherein a first terminal of the first MOS transistor is coupled to the battery unit, a first terminal of the second MOS transistor is coupled to the charging interface, a second terminal of the first MOS transistor is coupled to a second terminal of the second MOS transistor, and a control terminal of the first MOS transistor is coupled to a control terminal of the second MOS transistor and the first drive MOS transistor; the second switch unit includes a third MOS transistor and a fourth MOS transistor, wherein a first terminal of the third MOS transistor is coupled to the battery unit, a first terminal of the fourth MOS transistor is coupled to the charging interface, a second terminal of the third MOS transistor is coupled to a second terminal of the fourth MOS transistor, and a control terminal of the third MOS transistor is coupled to a control terminal of the fourth MOS transistor and the second drive MOS transistor.

According to yet another aspect of the present disclosure, a charging method is provided in a rechargeable device described in above aspect. The charging method includes sending a first control signal via the drive circuit to the first switch unit and the second switch unit, the first control signal indicating that the first switch unit is be turned on in response to the first charging path being needed to be on, and that both the first switch unit and the second switch unit is be turned off in response to the second charging path being needed to be off; wherein the second control unit sends a second control signal via the driving circuit to the second switch unit, the second control signal indicating that the second switch unit is turned on or off in response to the first switch unit being turned on.

Figure 2:
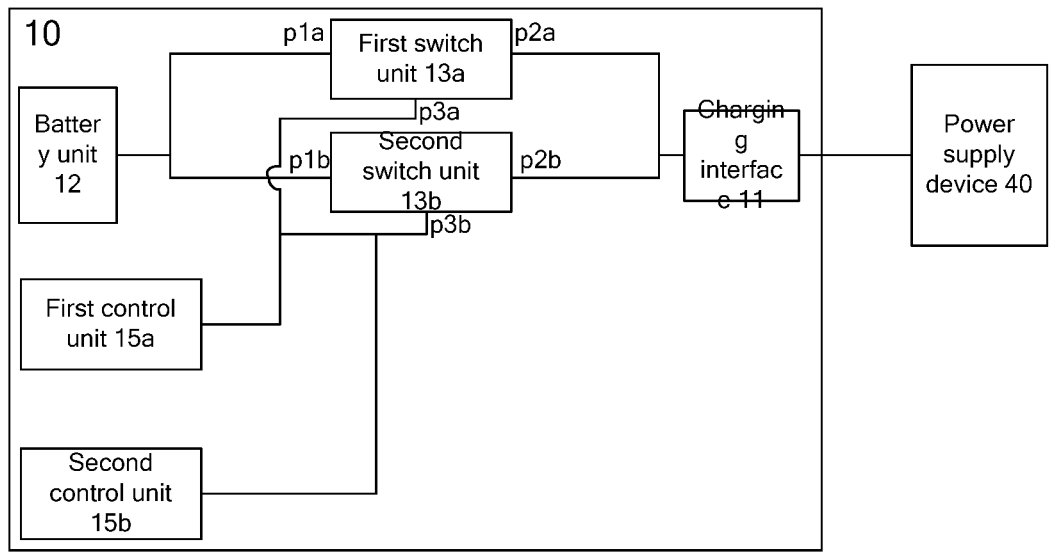
FIG. 2 is a block diagram of a rechargeable device according to some exemplary embodiments.

FIG. 2 is a block diagram of a rechargeable device according to some exemplary embodiments.

The rechargeable device 10 as shown in FIG. 2 may be, for example, a terminal or a communication terminal that includes, but is not limited to, a device provided to be coupled via a wired line such as a public switched telephone network (PSTN), a digital subscriber line (DSL), a digital cable, a direct cable connection, and/or another data connection/network, and/or via, for example, cellular networks, a wireless local area network (WLAN), a digital video network such as a digital video broadcasting handheld (DVB-H) network, a satellite network, an amplitude modulation-frequency modulation (AM-FM) broadcast transmitter, and/or a wireless interface of another communication terminal to receive/send communication signals. A communication terminal set to communicate via a wireless interface may be referred to as a "wireless communication terminal", a "wireless terminal", and/or a "mobile terminal". Examples of mobile terminals include, but are not limited to, satellite or cellular telephones, personal communication system (PCS) terminals that can combine cellular radio telephony with data processing, fax, and data communication capabilities, Personal Digital Assistant (PDA) containing radio telephones, pagers, Internet/Intranet access, Web browsers, notepads, calendars, and/or global positioning systems (GPS) receivers, and a conventional lap top and/or handheld receiver or other electronic device containing a radio telephone transceiver. In addition, the terminal may also include, but is not limited to, a rechargeable electronic device with charging capabilities such as an e-book reader, a smart wearable device, a mobile power source (e.g., rechargeable battery, travel charger), an electronic cigarette, a wireless mouse, a wireless keyboard, a wireless headset, a Bluetooth speaker, etc.

As shown in FIG. 2, the rechargeable device 10 includes a charging interface 11, a battery unit 12, a first switch unit 13a, a second switch unit 13b, a first control unit 15a, and a second control unit 15b.

The charging interface 11 can be, for example, a USB 2.0 interface, a micro USB interface, or a USB TYPE-C interface. In some embodiments, the charging interface 11 may also be a lightning interface, or any other type of parallel or serial port capable of being used for charging.

The battery unit 12 may be a lithium battery containing a single lithium battery cell, or a lithium battery containing multiple lithium battery cells. Alternatively, the battery unit 12 may also contain multiple battery cells, each of which contains one or more lithium battery cells.

The first switch unit 13a and the second switch unit 13b are coupled in parallel and coupled between the charging interface 11 and the battery unit 12.

When the first switch unit 13a and/or the second switch unit 13b is on, a charging path between the charging interface 11 and the battery unit 12 is on (the charging path is one in a first charging mode), and the battery unit 12 is charged by a voltage and a current input through the charging interface 11. That is, at least one of the first switch unit 13a and the second switch unit 13b being turned on indicates that the charging path is on.

It should be noted that when the first switch unit 13a and the second switch unit 13b are off, the charging path is off, and other charging paths, for example, one in a second charging mode, can be turned on in the rechargeable device 10 to charge the rechargeable device 10 in the second charging mode. That is, the first switch unit 13a and the second switch unit 13b are used to control turning on and off of the charging path in the first charging mode. Furthermore, it should be understood by those skilled in the art that the two charging paths cannot be turned on simultaneously, i.e. the rechargeable device 10 can only operate in one charging mode.

The first charging mode can be, for example, the fast charging mode described above, and the second charging mode can be, for example, the normal charging mode described above. A charging power in the first charging mode is greater than that in the second charging mode.

The first control unit 15a is coupled to the first switch unit 13a and is used for controlling the first switch unit 13a to be turned on when the charging path between the charging interface and the battery unit is needed to be on.

The second control unit 15b is coupled to the second switch unit 13b and is used for controlling the second switch unit 13b to be turned on or off when the first control unit 15a controls the first switch unit 13a to be turned on.

The first control unit 15a is also used to control both the first switch unit 13a and the second switch unit 13b to be turned off when the charging path between the charging interface 11 and the battery unit 12 (i.e., the charging path in the first charging mode described above) is needed to be off.

The first control unit 15a may be, for example, a microcontroller MCU, and the second control unit 15c may be, for example, an application processor.

As mentioned above, since the MCU has less I/O interface resources, it is not possible to provide multiple independent control signals to control multiple fast charging paths (e.g., first switch unit 13a and second switch unit 13b) separately and independently at the same time. Although the AP has a lot of I/O interface resources, it is worried that the AP will not be able to shut down the fast charging paths in time after the AP dies if the AP is used to control one or more of the multiple fast charging paths, and this will cause danger. In contrast, the rechargeable device 10 provided in the present disclosure can ensure the safety of fast charging in the case where multiple independent control signals are used. That is, only when the first control unit 15a controls the first switch unit 13a to be turned on, the second control unit 15b is allowed to control the second switch unit 13b to be turned on or off. If a problem such as a dead AP occurs, the first control unit 15a can immediately control the first switch unit 13a and the second switch unit 13b to be turned off, and then the fast charging mode is over.

It should be clearly understood that the present disclosure describes how to form and use particular examples, but the principles of the present disclosure are not limited to any details of these examples. Rather, these principles can be applied to many other embodiments based on the teachings disclosed in the present disclosure.

Figure 3:
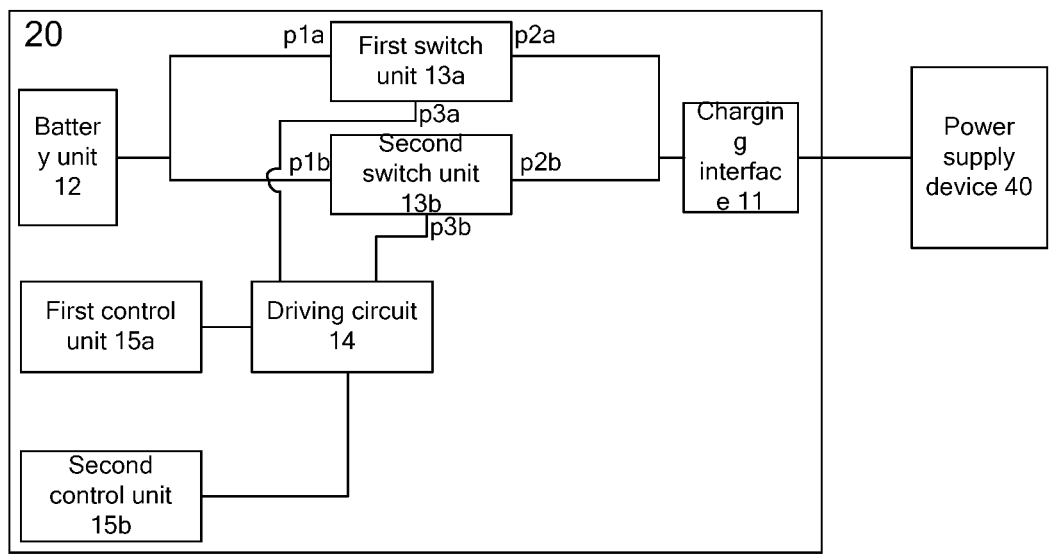
FIG. 3 is a block diagram of another rechargeable device according to some exemplary embodiments.

FIG. 3 is a block diagram of another rechargeable device according to some exemplary embodiments.

As shown in FIG. 3, the rechargeable device 20 includes a charging interface 11, a battery unit 12, a first switch unit 13a, a second switch unit 13b, a first control unit 15a, and a second control unit 15b.

The rechargeable device 20 is coupled to a power supply device 40 via the charging interface 11 to charge a battery unit 12.

The charging interface 11 can be, for example, a USB 2.0 interface, a micro USB interface, or a USB TYPE-C interface. In some embodiments, the charging interface 11 may also be a lightning interface, or any other type of parallel or serial port capable of being used for charging.

The battery unit 12 may be a lithium battery containing a single lithium battery cell, or a lithium battery containing multiple lithium battery cells. Alternatively, the battery unit 12 may also contain multiple battery cells, each of which contains one or more lithium battery cells.

For the rechargeable device containing a single cell, the heating phenomenon of the rechargeable device is more serious when a larger charging current is used to charge the single cell. In order to ensure the charging speed of the rechargeable device and to alleviate the heating phenomenon of the rechargeable device during the charging process, a modified battery structure can be used in which multiple cells are used to be coupled in series with each other, and the multiple cells are charged directly. That is, a voltage output from the adapter is loaded directly to both ends of the battery unit containing the multiple cells. Compared with the scheme with the single cell (i.e., the capacity of the single cell is considered to be the same as the total capacity of the modified series-coupled multiple cells), the charging current required for the multiple cells is about 1/N (N is the number of cells coupled in series) of the charging current required for the single cell if the same charging speed is to be achieved. In other words, with the same charging speed guaranteed, the multiple cells coupled in series can significantly reduce a size of the charging current, which thus further reduces the heat generation of the rechargeable device in the charging process.

The first switch unit 13a includes a first terminal p1a, a second terminal p2a, and a third terminal p3a. The first terminal p1a is coupled to the battery unit 12, the second terminal p2a is coupled to the charging interface 11, and the third terminal p3a is coupled to the driving circuit 14.

The second switch unit 13b includes a first terminal p1b, a second terminal p2b, and a third terminal p3b. The first terminal p1b is coupled to the battery unit 12, the second terminal p2b is coupled to the charging interface 11, and the third terminal p3b is coupled to the driving circuit 14.

The driving circuit 14 is used to drive the first switch unit 13a and the second switch unit 13b to be turned on and off, respectively, and thus control starting and ending of the fast charging.

Figure 4:
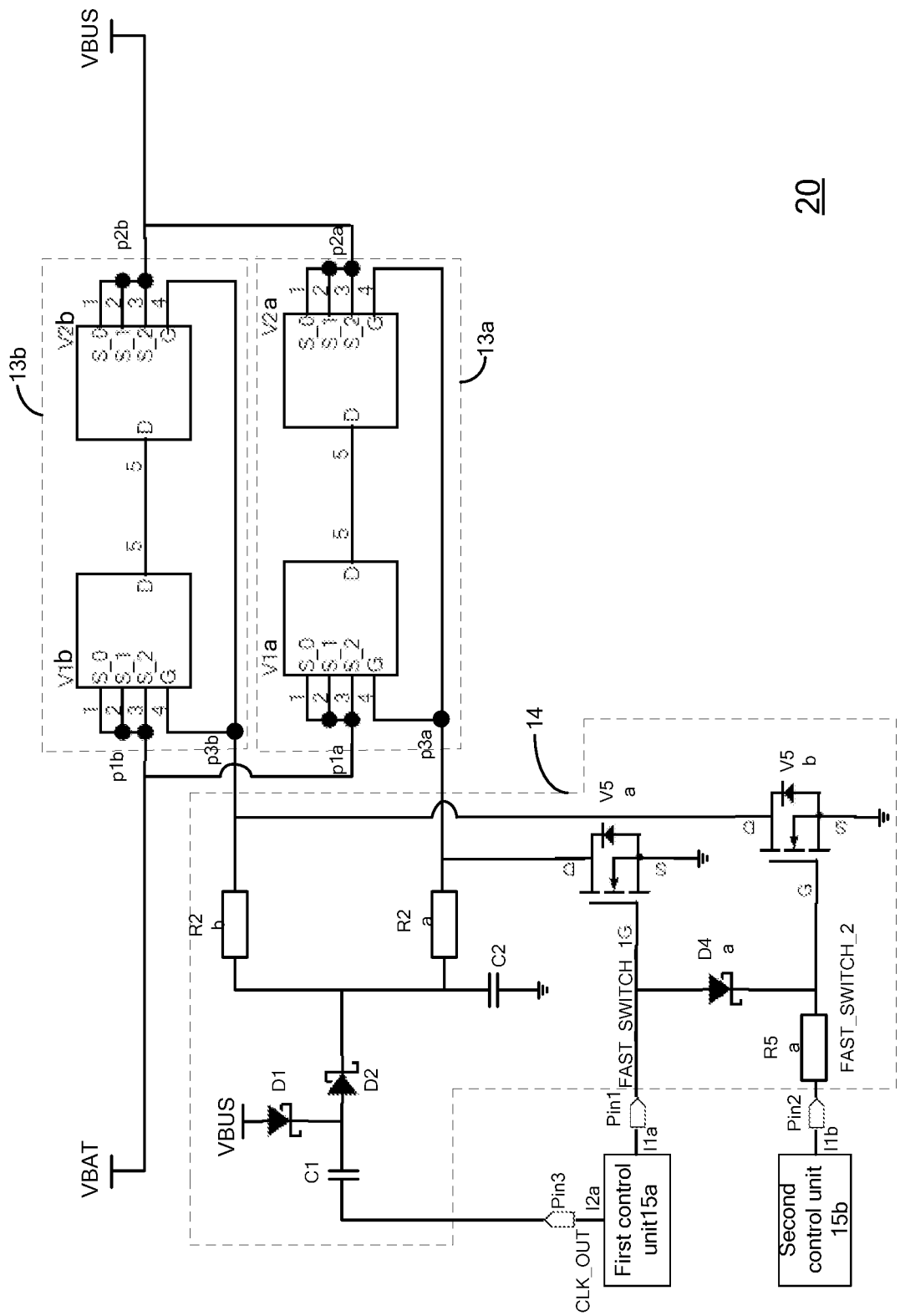
FIG. 4 is a circuitry schematic diagram of a rechargeable device according to some exemplary embodiments.

FIG. 4 is a circuitry schematic diagram of a rechargeable device according to some exemplary embodiments.

It should be noted that each MOS transistor in FIG. 4 is an example of an NMOS transistor, which is also used as an example in the following description and explanation of the principle. However, it will be understood by those skilled in the art how to apply the method provided by the embodiments of the present disclosure when each MOS transistor is replaced with a PMOS transistor based on the same inventive concept.

As shown in FIGS. 3 and 4 together, the driving circuit 14 includes a first drive MOS transistor V5a and a second drive MOS transistor V5b. A first terminal (e.g., drain D) of the first drive MOS transistor V5a is coupled to the third terminal p3a of the first switch unit 13a. A first terminal (e.g., drain D) of the second drive MOS transistor V5b is coupled to the third terminal p3b of the second switch unit 13b. A control terminal (i.e. gate G) of the first drive MOS transistor V5a is coupled to a control terminal (i.e. gate G) of the second drive MOS transistor V5b via a first diode D4a, where an anode of the first diode D4a is coupled to the control terminal of the first drive MOS transistor V5a and a cathode is coupled to the control terminal of the second drive MOS transistor V5b. Both a second terminal (e.g., source S) of the first drive MOS transistor V5a and a second terminal (e.g., source S) of the second drive MOS transistor V5b are grounded.

A first interface I1a of the first control unit 15a is coupled to a first pin Pin1 of the driving circuit 14 so that the first control unit 15a is coupled to the control terminal of the first drive MOS transistor V5a. A first interface I1b of the second control unit 15b is coupled to a second pin Pin2 of the driving circuit 14 via a first resistor R5a, such that the second control unit 15b is coupled to the control terminal of the second driver MOS transistor V5b.

As shown in FIG. 4, two independent control signals FAST_SWITCH_1 and FAST_SWITCH_2 are designed to control the first switch unit 13a and the second switch unit 13b, respectively, in the rechargeable device 20 of the present disclosure.

As mentioned above, since the MCU has less I/O interface resources, it is not possible to provide multiple independent control signals to control multiple fast charging paths (e.g., first switch unit 13a and second switch unit 13b) separately and independently at the same time. Although the AP has a lot of I/O interface resources, it is worried that the AP will not be able to shut down the fast charging paths in time after the AP dies if the AP is used to control one or more of the multiple fast charging paths, and this will cause danger. In contrast, the rechargeable device 20 provided in the present disclosure can ensure the safety of fast charging in the case where multiple independent control signals are used.

How the rechargeable device 20 operates during fast charging is described in the following with the first control unit 15a as the MCU and the second control unit 15b as the AP.

When the first control unit 15a inputs the control signal FAST_SWITCH_1 with a high level through the first pin Pin1 of the driving circuit 14, the control terminals of the first drive MOS transistor V5a and the second drive MOS transistor V5b are set to be a high level, so that both the first drive MOS transistor V5a and the second drive MOS transistor V5b are turned on. Thus, the first switch unit 13a and the second switch unit 13b are turned off, i.e. both fast charging paths are closed. Even though the second control unit 15b inputs the control signal FAST_SWITCH_2 with a low level through the second pin Pin2 of the driving circuit 14, the control terminal of the second drive MOS transistor V5b is still in a high level due to the first resistor R5a, and the second drive MOS transistor V5b is still on. Thus, the second switch unit 13b still cannot be turned on, i.e., the fast charging path cannot be on.

When the first control unit 15a inputs the control signal FAST_SWITCH_1 with a low level through the first pin Pin1 of the driving circuit 14, the control terminal of the first drive MOS transistor V5a is set to be a low level, and then the first drive MOS transistor V5a is turned off. Thus, the first switch unit 13a is turned on, i.e. the fast charging path is on. In addition, due to the first diode D4a, the control terminal of the second drive MOS transistor V5b is not set to be a low level as FAST_SWITCH_1 is low. Therefore, as the second pin Pin2 of the driving circuit 14 inputs the control signal FAST_SWITCH_2 with a low level, the second control unit 15b can turn off the second drive MOS transistor V5b, and then turn on the second switch unit 13b. Alternatively, as the second pin Pin2 of the driving circuit 14 inputs the control signal FAST_SWITCH_2 with a high level, the second control unit 15b can also turn on the second drive MOS transistor V5b, and then turn off the second switch unit 13b.

That is, the second control unit 15b can control starting or ending of the other fast charging path only when the first control unit 15a agrees to start the fast charging path, i.e., when the first control unit 15a inputs the control signal FAST_SWITCH_1 with a low level. And if the first control unit 15a does not agree to the fast charging path, the second control unit 15b will fail to control the other fast charging path. That is, in the case where two charging paths exists in FIG. 4, the first control signal FAST_SWITCH_1 indicates that the first switch unit 13a is be turned on in response to a first charging path being needed to be on, and that both the first switch unit 13a and the second switch unit 13b is be turned off in response to a second charging path being needed to be off, and the second control signal FAST_SWITCH_2 indicates that the second switch unit 13b is turned on or off in response to the first switch unit 13a being turned on. Thus, this ensures that even after the second control unit 15b dies, both charging paths can be turned off simultaneously by the first control unit 15a, avoiding the danger that the fast charging path cannot be turned off as the second control unit 15b dies.

As shown in FIGS. 3 and 4 again, the first control unit 15a may also provide a clock square wave signal CLK_OUT for the driving circuit 14 through its second interface I2a and the third pin Pin3 of the driving circuit 14.

The first switch unit 13a may include a first MOS transistor V1a and a second MOS transistor V2a. First terminals (e.g., sources S_0 to S_2 as shown in FIG. 4) of the first MOS transistor V1a are coupled to the battery unit 12 (i.e. VBAT in FIG. 4) through the first terminal p1a of the first switch unit 13a, first terminals (e.g. source S_0 to S_2 as shown in FIG. 4) of the second MOS transistor V2a are coupled to the charging interface 11 (i.e. VBUS in FIG. 4) through the second terminal p2a of the first switch unit 13a, a second terminal of the first MOS transistor V1a (e.g., drain D as shown in FIG. 4) is coupled to a second terminal of the second MOS transistor V2a (e.g., drain D as shown in FIG. 4), and a control terminal (i.e. gate G) of the first MOS transistor V1a is coupled to a control terminal (i.e. gate G) of the second MOS transistor V2a.

In some embodiments, both the first terminal of the first MOS transistor V1a and the first terminal of the second MOS transistor V2a may also be drains, and both the second terminal of the first MOS transistor V1a and the second terminal of the second MOS transistor V2a may be sources. That is, it is sufficient that the first MOS transistor V1a is coupled in reverse series with the second MOS transistor V2a, and thus power is supplied to the rechargeable device 20 through the power supply device 40 when the battery unit 12 is charged.

The second switch unit 13b may include a third MOS transistor V1b and a fourth MOS transistor V2b. First terminals (e.g., sources S_0 to S_2 as shown in FIG. 4) of the third MOS transistor V1b are coupled to the battery unit 12 through the first terminal p1b of the second switch unit 13b, first terminals (e.g., source S_0 to S_2 as shown in FIG. 4) of the fourth MOS transistor V2b are coupled to the charging interface 11 through the second terminal p2b of the second switch unit 13b, a second terminal (e.g., drain D as shown in FIG. 4) of the third MOS transistor V1b is coupled to a second terminal (e.g., drain D as shown in FIG. 4) of the fourth MOS transistor V2b, and a control terminal (i.e. gate G) of the third MOS transistor V1b is coupled to a control terminal (i.e. gate G) of the fourth MOS transistor V2b.

In some embodiments, both the first terminal of the third MOS transistor V1b and the first terminal of the fourth MOS transistor V2b may also be drains, and both the second terminal of the third MOS transistor V1b and the second terminal of the fourth MOS transistor V2b may be sources. That is, it is sufficient that the third MOS transistor V1b is coupled in reverse series with the fourth MOS transistor V2b, and thus power is supplied to the rechargeable device 20 through the power supply device 40 when the battery unit 12 is charged.

Furthermore, the first terminal (e.g., drain D as shown in FIG. 4) of the first drive MOS transistor V5a is coupled to the charging interface 11 via a diode D1, a diode D2 and a resistor R2a to receive the voltage VBUS provided by the power supply device 40. The first terminal (e.g., drain D as shown in FIG. 4) of the second drive MOS transistor V5b is coupled to the charging interface 11 via the diode D1, the diode D2 and a resistor R2b to receive the voltage VBUS provided by the power supply device 40.

Both the second terminal (e.g., source S as shown in FIG. 4) of the first drive MOS transistor V5a and the second terminal (e.g., source S as shown in FIG. 4) of the second drive MOS transistor V5b are grounded.

In some embodiments, as shown in FIG. 4, both the first drive MOS transistor V5a and the second drive MOS transistor V5b may be NMOS (N-type Metal Oxide Semiconductor) transistors, where both the first terminal of the first drive MOS transistor V5a and the first terminal of the second drive MOS transistor V5b are drains D of the NMOS transistors, and both the second terminal of the first drive MOS transistor V5a and the second terminal of the second drive MOS transistor V5b are sources S of the NMOS transistors.

As mentioned above, the AP can be used to control multiple fast charging paths because of its more abundant input/output interface resources.

Figure 5:
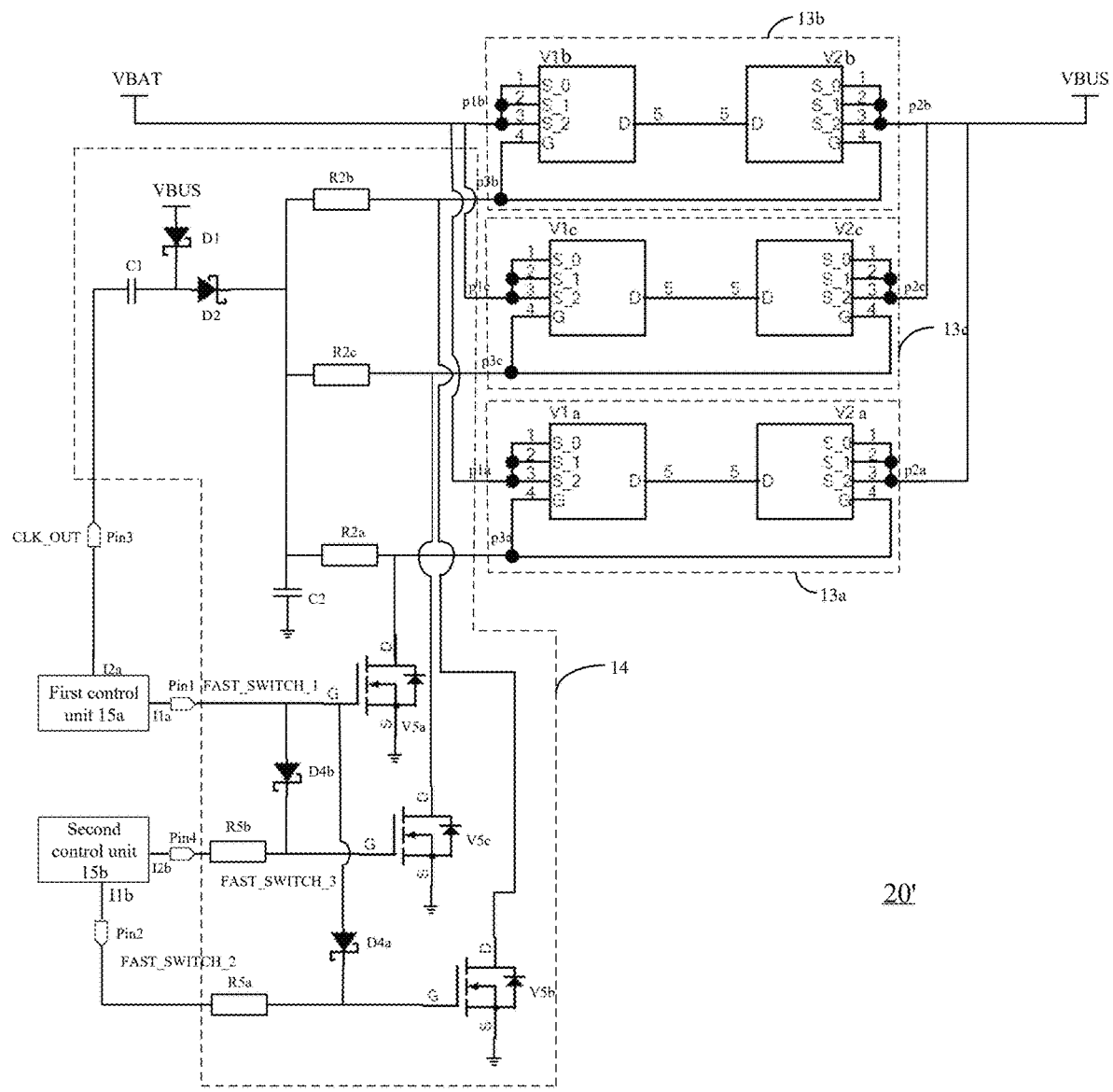
FIG. 5 is a circuitry schematic diagram of another rechargeable device according to some exemplary embodiments.

FIG. 5 is a circuitry schematic diagram of another rechargeable device according to some exemplary embodiments.

Different from the rechargeable device 20 shown in FIG. 4, the rechargeable device 20' shown in FIG. 5 also includes a third switch unit 13c. The third switch unit 13c includes a first terminal p1c, a second terminal p2c, and a third terminal p3c. The first terminal p1c of the third switch unit 13c is coupled to the battery unit 12, and the second terminal p2c of the third switch unit 13c is coupled to the charging interface 11. The driving circuit 14 is also used to drive the third switch unit 13c to be turned on and off. The driving circuit 14 also includes a third drive MOS transistor V5c. A first terminal (e.g., drain D as shown in FIG. 5) of the third drive MOS transistor V5c is coupled to a third terminal p3c of the third switch unit 13c, a control terminal (i.e. gate G) of the third drive MOS transistor V5c is coupled to the control terminal of the first drive MOS transistor V5a via a second diode D4b. An anode of the second diode D4b is coupled to the control terminal (i.e. gate G) of the first drive MOS transistor V5a, and a cathode of the second diode D4b is coupled to the control terminal (i.e. gate G) of the third drive MOS transistor V5c. The second interface I2b of the second control unit 15b is coupled to a fourth pin Pin4 of the driving circuit 14 through a second resistor R5b, and thus, the second control unit 15b is coupled to the control terminal (i.e. gate G) of the third drive MOS transistor V5c and inputs a control signal FAST_SWITCH_3 to the third drive MOS transistor V5c.

In some embodiments, in FIG. 5, the third drive MOS transistor V5c is also a NMOS as an example, but the present disclosure is not limited to this.

The third switch unit 13c may include a fifth MOS transistor V1c and a sixth MOS transistor V2c. First terminals (e.g., sources S_0 to S_2 as shown in FIG. 5) of the fifth MOS transistor V1c are coupled to the battery unit 12 through the first terminal p1c of the third switch unit 13c, first terminals (e.g., sources S_0 to S_2 as shown in FIG. 5) of the fourth MOS transistor V2b are coupled to the battery unit 12 (i.e. VBAT in FIG. 5) through the first terminal p1b of the second switch unit 13b, first terminals (e.g., source S_0 to S_2) of the sixth MOS transistor V2c are coupled to the charging interface 11 (i.e. VBUS in FIG. 5) through the second terminal p2c of the third switch unit 13c, a second terminal (e.g., drain D as shown in FIG. 5) of the fifth MOS transistor V1c is coupled to a second terminal (e.g., drain D as shown in FIG. 5) of the sixth MOS transistor V2c, and a control terminal (i.e. gate G) of the fifth MOS transistor V1c is coupled to a control terminal (i.e. gate G) of the sixth MOS transistor V2c.

In some embodiments, both the first terminal of the fifth MOS transistor V1c and the first terminal of the sixth MOS transistor V2c may also be drains, and both the second terminal of the fifth MOS transistor V1c and the second terminal of the sixth MOS transistor V2c may be sources. That is, it is sufficient that the fifth MOS transistor V1c is coupled in reverse series with the sixth MOS transistor V2c, and thus power is supplied to the rechargeable device 20' through the power supply device 40 when the battery unit 12 is charged.

In addition, the first terminal (e.g., drain D as shown in FIG. 5) of the third drive MOS transistor V5c is coupled to the charging interface 11 via a diode D1, a diode D2, and a resistor R2c to receive the voltage VBUS provided by the power supply device 40. The second terminal (e.g., source S as shown in FIG. 5) of the third drive MOS transistor V5c is grounded.

In some embodiments, the third drive MOS transistor V5c may be an NMOS transistor, as shown in FIG. 5, where the first terminal of the third drive MOS transistor V5c is the drain D of the NMOS transistor and the second terminal of the third drive MOS transistor V5c is the source S of the NMOS transistor.

Similarly, due to the second diode D4b and the second resistor R5b, although the control terminal of the third drive MOS transistor V5c is coupled to the second control unit 15b, only when the first control unit 15a inputs a control signal FAST_SWITCH_1 with a low level to the control terminal of the first drive MOS transistor V5a through the first interface I1a, the second control unit 15b inputs a control signal FAST_SWITCH_3 to the third drive MOS transistor V5c via its second interface I2b to effectively control the third drive MOS transistor V5c. That is, only when the first control unit 15a agrees to turn on the fast charging path, the second control unit 15b can control the third drive MOS transistor V5c to be turned on or off correspondingly, and thus control a corresponding fast charging path to be turned on and off. When the second control unit 15b is in a situation such as dead, all fast charging paths can be quickly shut down by the first control unit 15a to avoid danger.

It should be noted that, for the sake of simplifying the accompanying drawings, other components in FIG. 1 that play a protective function are omitted in both FIG. 4 and FIG. 5.

In the rechargeable device provided in this disclosure, when the first control unit (e.g. MCU) has insufficient input/output interface resources, the second control unit (e.g. AP) with abundant input/output interface resources can be used to control one or more fast charging paths. And with a hardware design, it can be ensured that even when the second control unit is in a situation such as dead, there is no danger that the fast charging path cannot be shut down. Thus, this ensures safety of fast charging and saves interface resources of the MCU at the same time. It should be clearly understood that the present disclosure describes how to form and use particular examples, but the principles of the present disclosure are not limited to any details of these examples. Rather, these principles can be applied to many other embodiments based on the teachings disclosed in the present disclosure.

The following are examples of method embodiments of the present disclosure that can be applied to embodiments of devices of the present disclosure. For details not disclosed in the method embodiments of the present disclosure, reference is made to the device embodiments of the present disclosure.

Figure 6:
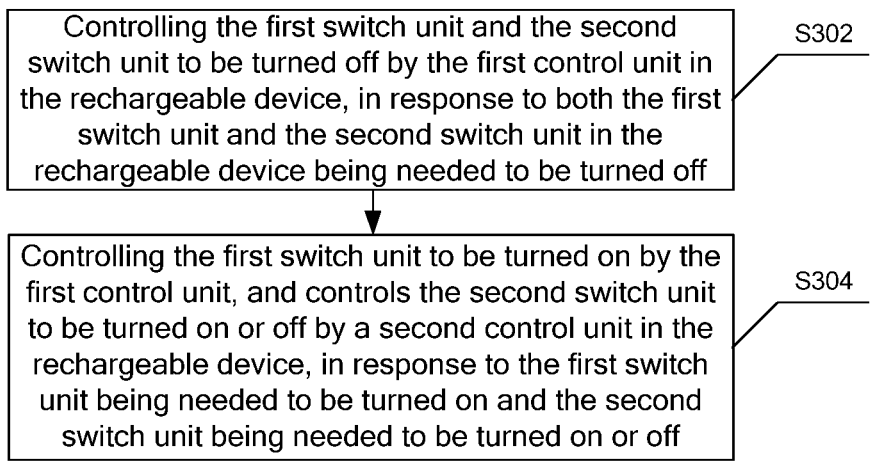
FIG. 6 is a flowchart of a charging method according to some exemplary embodiments.

FIG. 6 is a flowchart of a charging method according to some exemplary embodiments.

As shown in FIG. 6, the charging method 30 may be applied, for example, in the device 20, 10 or 10' to be charged as described above, and include actions/operations in the following.

At block S302, the method controls the first switch unit and the second switch unit to be turned off by the first control unit in the rechargeable device, in response to both the first switch unit and the second switch unit in the rechargeable device being needed to be turned off.

In some embodiments, controlling the first switch unit and the second switch unit to be turned off by the first control unit in the rechargeable device includes: controlling a first drive MOS transistor and a second drive MOS transistor in the rechargeable device to drive the first switch unit and the second switch unit to be turned off, respectively, in response to a first control signal sent to the first drive MOS transistor by the first control unit being set to be a high level.

At block S304, the method controls the first switch unit to be turned on by the first control unit, and controls the second switch unit to be turned on or off by a second control unit in the rechargeable device, in response to the first switch unit being needed to be turned on and the second switch unit being needed to be turned on or off.

When the first switch unit and/or the second switch unit is on, the charging path between a charging interface in the rechargeable device and a battery unit in the rechargeable device is on, and the battery unit is charged by a voltage and a current input through the charging interface.

In some embodiments, the controlling, by the first control unit, the first switch unit to be turned on includes controlling, by the first control unit, a first drive MOS transistor to drive the first switch unit to be turned on, in response to a first control signal sent to the first drive MOS transistor from the first control unit being set to be a low level.

In some embodiments, the controlling, by the second control unit in the rechargeable device, the second switch unit to be turned on or off includes controlling, by the second control unit, a second drive MOS transistor in the rechargeable device to drive the second switch unit to be turned on or off via a second control signal sent to the second drive MOS transistor from the second control unit, in response to the first switch unit being turned on.

In some embodiments, the method 30 further includes: controlling the first switch unit and the third switch unit to be turned off by the first control unit in the rechargeable device, in response to both the first switch unit and the third switch unit in the rechargeable device being needed to be turned off, and controlling the first switch unit to be turned on by the first control unit, and controlling the third switch unit to be turned on or off by a second control unit in the rechargeable device, in response to the first switch unit being needed to be turned on and the third switch unit being needed to be turned on or off.

In some embodiments, controlling the first switch unit and the third switch unit to be turned off by the first control unit in the rechargeable device includes: controlling the first drive MOS transistor and a third drive MOS transistor in the rechargeable device to drive the first switch unit and the third switch unit to be turned off, respectively, in response to a first control signal sent to the first drive MOS transistor by the first control unit being set to be a high level.

In some embodiments, the controlling, by the first control unit, the first switch unit to be turned on includes controlling, by the first control unit, a first drive MOS transistor to drive the first switch unit to be turned on, in response to a first control signal sent to the first drive MOS transistor from the first control unit being set to be a low level.

In some embodiments, the controlling, by the second control unit in the rechargeable device, the third switch unit to be turned on or off includes controlling, by the second control unit, a third drive MOS transistor in the rechargeable device to drive the third switch unit to be turned on or off via a second control signal sent to the third drive MOS transistor from the second control unit, in response to the first switch unit being turned on.

It is to be noted that the foregoing accompanying drawings are merely schematic illustrations of the processing included in the methods according to exemplary embodiments of the present disclosure, and are not intended to be limited. It is readily understood that the processing shown above in the accompanying drawings does not indicate or limit the temporal order of such processing. It is also readily understood that these processes may be performed, for example, in multiple modules, either synchronously or asynchronously.

Exemplary embodiments of the present disclosure are specifically illustrated and described above. It should be understood that the present disclosure is not limited to the detailed structure, manner of set-up, or method of implementation described herein. Rather, the present disclosure is intended to cover a variety of modifications and equivalent set-ups included within the spirit and scope of the appended claims.

What is claimed is:

1. A rechargeable device, comprising:
a charging interface;
a battery unit;
a first switch unit and a second switch unit coupled in parallel, coupled between the charging interface and the battery unit, a charging path defined between the battery unit and the charging interface being on and the battery unit being charged by a voltage and a current input by the charging interface, in response to at least one of the first switch unit and the second switch unit being turned on;
a first control unit coupled to the first switch unit, configured to control the first switch unit to be turned on in response to the charging path being needed to be on, and to control both the first switch unit and the second switch unit to be turned off in response to the charging path being needed to be off; and
a second control unit coupled to the second switch unit, configured to control the second switch unit to be turned on or off in response to the first control unit controlling the first switch unit to be turned on.

2. The rechargeable device as claimed in claim 1, further comprising:
a driving circuit, comprising:
a first drive MOS transistor, coupled to the first switch unit and the first control unit, respectively; and
a second drive MOS transistor, coupled to the second switch unit, the first control unit, and the second control unit, respectively;
wherein the first drive MOS transistor is controlled to drive the first switch unit to be turned off and the second drive MOS transistor is controlled to drive the second switch unit to be turned off, in response to a first control signal sent from the first control unit being set to be a first level; and
wherein the first drive MOS transistor is controlled to drive the first switch unit to be turned on, and the second drive MOS transistor is controlled by a second control signal sent from the second control unit and to drive the second switch unit to be turned on or off, in response to the first control signal being set to be a second level lower than the first level.

3. The rechargeable device as claimed in claim 2, wherein the first drive MOS transistor is further coupled to the second drive MOS transistor via a first diode; and
the second drive MOS transistor is coupled to the second control unit via a first resistor.

4. The rechargeable device as claimed in claim 1, wherein the first control unit is an MCU.

5. The rechargeable device as claimed in claim 4, wherein the second control unit is an application processor.

6. The rechargeable device as claimed in claim 3, wherein the first control unit further provides a clock square wave signal.

7. The rechargeable device as claimed in claim 3, wherein the first switch unit comprises a first MOS transistor and a second MOS transistor, wherein a first terminal of the first MOS transistor is coupled to the battery unit, a first terminal of the second MOS transistor is coupled to the charging interface, a second terminal of the first MOS transistor is coupled to a second terminal of the second MOS transistor, and a control terminal of the first MOS transistor is coupled to a control terminal of the second MOS transistor;
the first MOS transistor and the second MOS transistor are drove to be turned off such that the first switch unit is turned off, in response to the first control signal being set to be the first level;
the first MOS transistor and the second MOS transistor are drove to be turned on such that the first switch unit is turned off, in response to the first control signal being set to be the second level.

8. The rechargeable device as claimed in claim 7, wherein both the first terminal of the first MOS transistor and the first terminal of the second MOS transistor are sources, and both the second terminal of the first MOS transistor and the second terminal of the second MOS transistor are drains; or
both the first terminal of the first MOS transistor and the first terminal of the second MOS transistor are drains, and both the second terminal of the first MOS transistor and the second terminal of the second MOS transistor are sources.

9. The rechargeable device as claimed in claim 3, wherein the second switch unit comprises a third MOS transistor and a fourth MOS transistor, wherein a first terminal of the third MOS transistor is coupled to the battery unit, a first terminal of the fourth MOS transistor is coupled to the charging interface, a second terminal of the third MOS transistor is coupled to a second terminal of the fourth MOS transistor, and a control terminal of the third MOS transistor is coupled to a control terminal of the fourth MOS transistor;
the third MOS transistor and the fourth MOS transistor are drove to be turned off such that the second switch unit is turned off, in response to the first control signal via the first diode being set to be the first level;
the third MOS transistor and the fourth MOS transistor are drove to be turned off such that the second switch unit is turned off, in response to the first control signal via the first diode being set to be the second level and the second control signal being set to be a third level;
the third MOS transistor and the fourth MOS transistor are drove to be turned on such that the second switch unit is turned on, in response to the first control signal via the first diode being set to be the second level and the second control signal being set to be a fourth level lower than the third level.

10. The rechargeable device as claimed in claim 9, wherein both the first terminal of the third MOS transistor and the first terminal of the fourth MOS transistor are sources, and both the second terminal of the third MOS transistor and the second terminal of the fourth MOS transistor are drains; or both the first terminal of the third MOS transistor and the first terminal of the fourth MOS transistor are drains, and both the second terminal of the third MOS transistor and the second terminal of the fourth MOS transistor are sources.

11. The rechargeable device as claimed in claim 7, wherein the first terminal of the first drive MOS transistor and the first terminal of the second drive MOS transistor are coupled to the charging interface to receive a voltage provided by a power supply device;

both the second terminal of the first drive MOS transistor and the second terminal of the second drive MOS transistor are grounded.

12. The rechargeable device as claimed in claim 11, wherein both the first drive MOS transistor and the second drive MOS transistor are NMOS transistors, wherein both the first terminal of the first drive MOS transistor and the first terminal of the second drive MOS transistor are drains of the NMOS transistors, and both the second terminal of the first drive MOS transistor and the second terminal of the second drive MOS transistor are sources of the NMOS transistors.

13. The rechargeable device as claimed in claim 3, further comprising:

a third switch unit, coupled between the charging interface and the battery unit;

wherein the driving circuit is further configured to drive the third switch unit to be turned on and off and further comprises a third drive MOS transistor, the third drive MOS transistor being coupled to the third switch unit, the first control unit, and the second control unit;

the third drive MOS transistor is controlled to drive the third switch unit to be turned off, in response to the first control signal sent from the first control unit being set to be the first level;

the third drive MOS transistor is controlled by a third control signal sent from the second control unit to drive the third switch unit to be turned on or off, in response to the first control signal sent from the first control unit being set to be the second level.

14. The rechargeable device as claimed in claim 13, wherein the first drive MOS transistor is further coupled to the third drive MOS transistor via a second diode; and the third drive MOS transistor is coupled to the second control unit via a second resistor.

15. A rechargeable device, comprising:
a charging interface;
a battery unit;
at least two charging paths defined between the battery unit and the charging interface, comprising a first charging path and a second charging path, the first charging path having a first switch unit thereon and the second charging path having a second switch unit thereon;
a driving circuit coupled to the first switch unit and the second switch unit;
a first control unit coupled to the driving circuit, configured to send a first control signal via the driving circuit to the first switch unit and the second switch unit, the first control signal indicating that the first switch unit is be turned on in response to the first charging path being needed to be on, and that both the first switch unit and the second switch unit is be turned off in response to the second charging path being needed to be off; and a second control unit coupled to the driving circuit, configured to send a second control signal via the driving circuit to the second switch unit, the second control signal indicating that the second switch unit is turned on or off in response to the first switch unit being turned on.

16. The rechargeable device as claimed in claim 15, wherein the first control signal with a first level indicates that both the first switch unit and the second switch unit is be turned off in response to the second charging path being needed to be off, and the first control signal with a second level indicates that the first switch unit is be turned on in response to the first charging path being needed to be on, the second level being lower than the first level.

17. The rechargeable device as claimed in claim 15, wherein the second control signal with a third level indicates that the second switch unit is turned off, the second control signal with a fourth level indicates that the second switch unit is turned on, the third level being lower than the fourth level.

18. The rechargeable device as claimed in claim 16, wherein the driving circuit comprises at least two drive MOS transistors; and the at least two drive MOS transistors comprises:
a first drive MOS transistor, coupled to the first switch unit and the first control unit, respectively; and
a second drive MOS transistor, coupled to the second switch unit, the first control unit, the second control unit via a first resistor, and the first drive MOS transistor via a first diode, respectively;
wherein the first drive MOS transistor is controlled to drive the first switch unit to be turned off and the second drive MOS transistor is controlled to drive the second switch unit to be turned off, in response to the first control signal being set to be the first level; and
wherein the first drive MOS transistor is controlled to drive the first switch unit to be turned on, and the second drive MOS transistor is controlled by the second control signal to drive the second switch unit to be turned on or off, in response to the first control signal being set to be the second level.

19. The rechargeable device as claimed in claim 18, wherein the first switch unit comprises a first MOS transistor and a second MOS transistor, wherein a first terminal of the first MOS transistor is coupled to the battery unit, a first terminal of the second MOS transistor is coupled to the charging interface, a second terminal of the first MOS transistor is coupled to a second terminal of the second MOS transistor, and a control terminal of the first MOS transistor is coupled to a control terminal of the second MOS transistor and the first drive MOS transistor;

the second switch unit comprises a third MOS transistor and a fourth MOS transistor, wherein a first terminal of the third MOS transistor is coupled to the battery unit, a first terminal of the fourth MOS transistor is coupled to the charging interface, a second terminal of the third MOS transistor is coupled to a second terminal of the fourth MOS transistor, and a control terminal of the third MOS transistor is coupled to a control terminal of the fourth MOS transistor and the second drive MOS transistor.

20. A charging method in a rechargeable device, the rechargeable device comprising:
a charging interface;
a battery unit;

at least two charging paths defined between the battery unit and the charging interface, comprising a first charging path and a second charging path, the first charging path having a first switch unit thereon, and the second charging path having a second switch unit thereon;

a driving circuit coupled to the first switch unit and the second switch unit;

a first control unit coupled to the driving circuit; and a second control unit coupled to the driving circuit;

the charging method comprising:

sending a first control signal via the drive circuit to the first switch unit and the second switch unit, the first control signal indicating that the first switch unit is be turned on in response to the first charging path being needed to be on, and that both the first switch unit and the second switch unit is be turned off in response to the second charging path being needed to be off;

wherein the second control unit sends a second control signal via the driving circuit to the second switch unit, the second control signal indicating that the second switch unit is turned on or off in response to the first switch unit being turned on.

* * * * *